United States Patent
Hirose et al.

(10) Patent No.: US 9,346,043 B2
(45) Date of Patent: May 24, 2016

(54) HONEYCOMB STRUCTURE AND HONEYCOMB CATALYST

(71) Applicant: NGK Insulators, Ltd., Nagoya (JP)

(72) Inventors: Shogo Hirose, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 325 days.

(21) Appl. No.: 13/785,352

(22) Filed: Mar. 5, 2013

(65) Prior Publication Data
US 2013/0236687 A1 Sep. 12, 2013

(30) Foreign Application Priority Data
Mar. 6, 2012 (JP) .................................. 2012-049684

(51) Int. Cl.
| | | |
|---|---|---|
| *B01J 35/04* | (2006.01) | |
| *B01J 35/00* | (2006.01) | |
| *B01J 35/10* | (2006.01) | |
| *B01J 29/70* | (2006.01) | |
| *B01J 37/00* | (2006.01) | |
| *B01J 37/02* | (2006.01) | |

(52) U.S. Cl.
CPC ................ *B01J 35/04* (2013.01); *B01J 35/002* (2013.01); *B01J 35/10* (2013.01); *B01J 35/1023* (2013.01); *B01J 35/1028* (2013.01); *B01J 35/1076* (2013.01); *B01J 29/7007* (2013.01); *B01J 37/0018* (2013.01); *B01J 37/0215* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 2003/0024219 A1 | 2/2003 | Harada et al. | |
| 2004/0166035 A1 | 8/2004 | Noda et al. | |
| 2005/0255288 A1 | 11/2005 | Noguchi et al. | |
| 2007/0048494 A1 | 3/2007 | Miyairi et al. | |
| 2007/0224092 A1* | 9/2007 | Miyairi et al. ................. | 422/180 |
| 2008/0125316 A1* | 5/2008 | Noda et al. ..................... | 502/439 |

FOREIGN PATENT DOCUMENTS

| | | |
|---|---|---|
| EP | 0 736 503 A2 | 10/1996 |
| EP | 1 293 241 A2 | 3/2003 |
| JP | 2001-269585 AI | 10/2001 |
| JP | 2003-033664 A1 | 2/2003 |
| JP | 4246475 B2 | 4/2009 |
| JP | 2009-242133 A1 | 10/2009 |

OTHER PUBLICATIONS

Extended European Search Report (Application No. 13157955.9) dated Feb. 11, 2014.

* cited by examiner

*Primary Examiner* — Colin W Slifka
(74) *Attorney, Agent, or Firm* — Burr & Brown, PLLC

(57) ABSTRACT

There is disclosed a honeycomb structure usable as a support of a honeycomb catalyst onto which a large amount of catalyst can be loaded and which has a good purification efficiency, and the honeycomb structure includes porous partition walls 5 defining a plurality of cells to form through channels of a fluid and having a plurality of pores 10 therein, wherein a porosity of the partition walls 5 is from 45 to 70%, and in a cross section perpendicular to an extending direction of the cells, a total area of macro pores 12 having the largest pore diameter of larger than 10 μm is 50% or more with respect to a total area of the pores 10.

5 Claims, 2 Drawing Sheets

HONEYCOMB STRUCTURE AND HONEYCOMB CATALYST

The present application is an application based on JP-2012-049684 filed on Mar. 6, 2012 with the Japanese Patent Office, the entire contents of which are incorporated herein by reference.

BACKGROUND OF THE INVENTION

1. Field of the Invention

The present invention relates to a honeycomb structure and a honeycomb catalyst. More particularly, it relates to a honeycomb structure usable as a support of a honeycomb catalyst onto which a large amount of catalyst can be loaded and having a good purification efficiency and showing an excellent thermal shock resistance, and the honeycomb catalyst.

2. Description of Related Art

Heretofore, there has been suggested an exhaust gas purifying device in which a catalyst for purification is loaded onto a catalyst support in order to purify the components to be purified such as nitrogen oxides (NOx) included in an exhaust gas discharged from a stationary engine for a car, a construction machine or an industrial purpose, a burning appliance or the like.

As the catalyst support for such an exhaust gas purification device, there is used, for example, a honeycomb structure including porous partition walls defining a plurality of cells acting as through channels of a fluid (e.g., see Patent Documents 1 to 4). Moreover, the catalyst for purification is loaded onto the surfaces of the partition walls of the honeycomb structure and inside the porous pores. In recent years, it has been studied to make a porosity of the partition walls of the honeycomb structure high in order to increase an amount of the catalyst to be loaded onto the honeycomb structure.

[Patent Document 1] JP-A-2009-242133
[Patent Document 2] JP-B-4246475
[Patent Document 3] JP-A-2003-33664
[Patent Document 4] JP-A-2001-269585

SUMMARY OF THE INVENTION

However, when it simply makes a porosity of partition walls of a honeycomb structure high, catalyst loading properties can be enhanced, but pores are closed with a catalyst to reduce the contact ratio between an exhaust gas and the catalyst. That is, a contact area between the exhaust gas and the catalyst decreases. Therefore, the catalyst which does not effectively act increases. As a result, there has been a problem that the purification efficiency of the exhaust gas becomes worse.

The present invention has been made in view of such problems of the conventional technology, and an object thereof is to provide a honeycomb structure usable as a support of a honeycomb catalyst onto which a large amount of catalyst can be loaded and having a good purification efficiency and showing an excellent thermal shock resistance, and the honeycomb catalyst.

According to the present invention, there are provided the following honeycomb structure and honeycomb catalyst.

[1] A honeycomb structure including porous partition walls defining a plurality of cells to form through channels of a fluid and having a plurality of pores therein, wherein a porosity of the partition walls is from 45 to 70%, and in a cross section perpendicular to an extending direction of the cells, a total area of macro pores having the largest pore diameter of larger than 10 μm is 50% or more with respect to a total area of the pores.

[2] The honeycomb structure according to [1], wherein in the cross section perpendicular to the extending direction of the cells, an outer peripheral shape of the macro pores being contained in the partition walls is at least one of a circular shape and an elliptic shape.

[3] A honeycomb catalyst including the honeycomb structure according to [1] or [2]; and a catalyst loaded onto the surfaces of the pores being contained in the partition walls of the honeycomb structure, wherein in a cross section perpendicular to an extending direction of the cells, a total area of high cavity ratio pores having a catalyst occupying area of 50% or less among the macro pores is from 15 to 40% with respect to a total area of the pores.

In a honeycomb structure of the present invention, partition walls contain "macro pores having the largest pore diameter of larger than 10 μm". Therefore, a large amount of catalyst can be loaded. Moreover, in the honeycomb structure of the present invention, "a porosity of the partition walls is from 45 to 70%", and a total area of the "macro pores having the largest pore diameter of larger than 10 μm" is 50% or more with respect to a total area of pores. Therefore, when the catalyst is loaded, it is possible to obtain a honeycomb catalyst having a large contact area between the catalyst and an exhaust gas and having a good purification efficiency. That is, the honeycomb structure of the present invention can be used as a support of the honeycomb catalyst having a good purification efficiency. In addition, in the honeycomb structure of the present invention, since "the porosity of the partition walls is from 45 to 70%" and the total area of "the macro pores" is 50% or more with respect to the total area of the pores, the pores closed with the catalyst decrease when the catalyst is loaded. When the pores closed with the catalyst decrease in this way, a thermal expansion ratio of the obtained honeycomb catalyst does not become excessively high as compared with a case where the pores closed with the catalyst is large. Thus, a honeycomb catalyst using the honeycomb structure of the present invention as the support can show an excellent thermal shock resistance.

A honeycomb catalyst of the present invention includes a honeycomb structure of the present invention, and a catalyst loaded onto the surfaces of the pores being contained in the partition walls, in addition to the surfaces of partition walls, of the honeycomb structure of the present invention. Moreover, in the honeycomb catalyst of the present invention, "a total area of high cavity ratio pores is from 15 to 40% with respect to a total area of the pores". Therefore, in the honeycomb catalyst of the present invention, one may ensure the formation of through channels capable of providing a good diffusion for the exhaust gas flowing into the honeycomb catalyst. So, the exhaust gas having flowed into the honeycomb catalyst suitably diffuses in the honeycomb catalyst. As a result, a contact chance between the exhaust gas and the catalyst increases. That is, the catalyst is effectively used for purifying the exhaust gas. Accordingly, the honeycomb catalyst of the present invention has a good purification efficiency.

DETAILED DESCRIPTION OF THE INVENTION

Hereinafter, embodiments of the present invention will be described, but it should be understood that the present invention is not limited to the following embodiments and that modifications, improvements and the like suitably added to the following embodiments based on the ordinary knowledge of a person skilled in the art without departing from the scope of the present invention are also included in the scope of the present invention.

Figure 1:
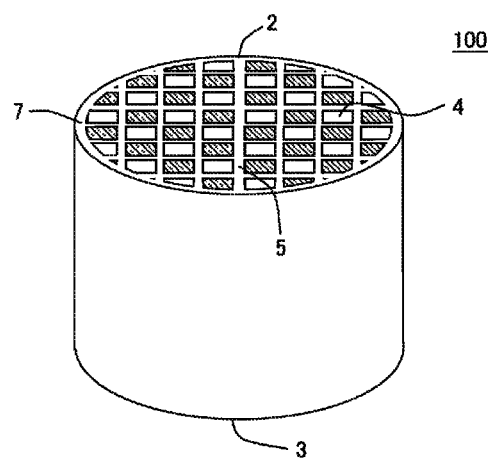
FIG. 1 is a perspective view schematically showing an embodiment of a honeycomb structure of the present invention.
Figure 2:
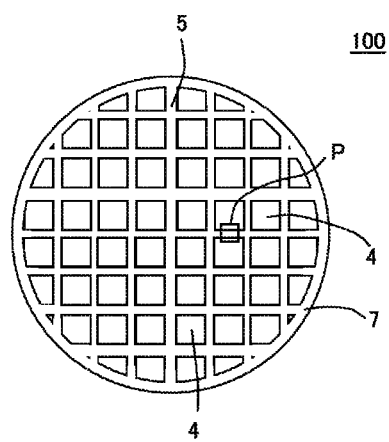
FIG. 2 is a cross sectional view schematically showing a cross section, which is perpendicular to an extending direction of cells, of the honeycomb structure shown in FIG. 1.
Figure 3:
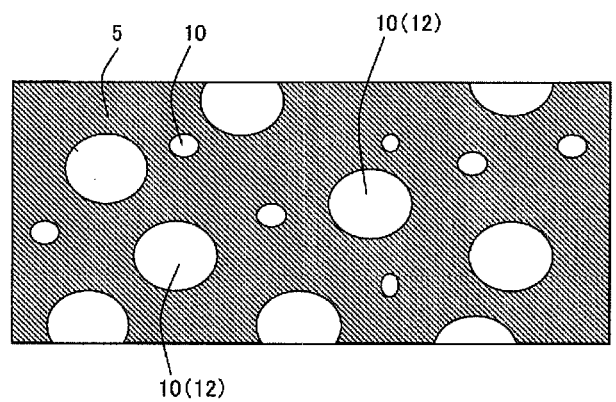
FIG. 3 is an enlarged cross sectional view schematically showing part of partition walls of the honeycomb structure shown in FIG. 2.

[1] Honeycomb Structure:

As a honeycomb structure 100 shown in FIG. 1 and FIG. 2, an embodiment of a honeycomb structure of the present invention includes porous partition walls 5 defining a plurality of cells 4 to form through channels of a fluid and having a plurality of pores 10 therein (see FIG. 3). Moreover, the honeycomb structure 100 includes the partition walls 5 having a porosity of from 45 to 70%. Furthermore, in a cross section perpendicular to an extending direction of the cells 4 of the honeycomb structure 100, a total area of macro pores 12 having the largest pore diameter of larger than 10 μm is 50% or more with respect to a total area of the pores 10 (see FIG. 3).

Such a honeycomb structure 100 includes the partition walls containing "the macro pores having the largest pore diameter of larger than 10 μm" therein. Therefore, a large amount of catalyst can be loaded. Moreover, in the honeycomb structure of the present invention, "the porosity of the partition walls is from 45 to 70%", and "the total area of the macro pores "having the largest pore diameter of larger than 10 μm" is 50% or more with respect to the total area of the pores". Therefore, when a honeycomb catalyst according to the present invention is prepared, through channels making an exhaust gas diffuse therein efficiently are formed surely in the honeycomb catalyst. So, the exhaust gas diffuses inside the honeycomb catalyst. As a result, it is possible to make the catalyst act effectively. That is, the catalyst which does not come in contact with the exhaust gas can be decreased. Therefore, the honeycomb structure 100 can obtain the honeycomb catalyst having a good purification efficiency. Furthermore, when the honeycomb catalyst according to the present invention is prepared, since the pores closed with the catalyst decrease, a thermal expansion ratio does not become excessively high in the honeycomb structure 100. Therefore, the honeycomb catalyst using the present honeycomb structure 100 as a support may show an excellent thermal shock resistance. "The pores closed with the catalyst" means such a state that cavities in the pores are filled with the catalyst, and the exhaust gas cannot flow into the pores. "The largest pore diameter" means a length of the longest line segment among line segments each connecting two points to each other on outer peripheral edges of the pores in an image by image analysis. Hereinafter, the pore having the largest pore diameter of larger than 10 μm is called as the macro pore. FIG. 1 is a perspective view schematically showing an embodiment of the honeycomb structure of the present invention. FIG. 2 is a cross sectional view schematically showing the cross section, which is perpendicular to the extending direction of the cells, of the honeycomb structure shown in FIG. 1.

The porosity of the partition walls 5 is from 45 to 70%, preferably from 50 to 65%, and further preferably from 50 to 60%. When the porosity of the partition walls 5 is within the above range, a large amount of catalyst can be loaded. Moreover, increase of a pressure loss can be prevented while moderately maintaining a strength of the honeycomb structure. The porosity of the partition walls 5 is a value measured by a mercury porosimeter. When the porosity of the partition walls 5 is smaller than 45%, the pressure loss might increase. Moreover, when the porosity of the partition walls 5 is larger than 70%, the strength of the honeycomb structure might not sufficiently be obtained.

The partition walls 5 have the plurality of pores 10 therein, and these pores 10 include macro pores 12. That is, the macro pores 12 are the pores having the largest pore diameter of larger than 10 μm among the pores 10. However, the macro pores have an area of 100 μm$^2$ or more in the cross section perpendicular to the cell extending direction. Moreover, "the pores being contained in the partition walls 5" have an area of 1 μm$^2$ or more in the cross section perpendicular to the cell extending direction. The area of the pores are values calculated by analyzing the image of a plurality of arbitrary view fields taken by a scanning type electron microscope (SEM).

As described above, in the honeycomb structure 100, the total area of the macro pores is 50% or more, preferably from 50 to 85%, and further preferably from 60 to 80% with respect to the total area of the pores. When the total area of the macro pores is smaller than 50% with respect to the total area of the pores, it is hardly to surely form the through channels making the exhaust gas diffuse therein effectively in the honeycomb catalyst when the honeycomb catalyst is prepared by using such a honeycomb structure. Therefore, a contact area between the catalyst and the exhaust gas decreases, and the purification efficiency of the exhaust gas becomes worse. Moreover, when the honeycomb catalyst is prepared by using such a honeycomb structure, since the pores closed with the catalyst increase, the thermal expansion ratio becomes excessively high as compared with a case where the number of the pores closed with the catalyst is lower. As a result, the thermal shock resistance of the honeycomb catalyst using the honeycomb structure 100 as the support reduces.

Incidentally, in the present specification, "the total area of the pores" is a value calculated as follows. First, the plurality of arbitrary view fields of the cross sections, which are perpendicular to the cell extending direction, of the partition walls of the honeycomb structure are taken by the scanning type electron microscope (SEM). Then, each taken image is binarized by the image analysis, and divided into a cavity portion and a partition wall portion other than cavities. Next, all areas of portions corresponding to "the pores" in the respective images are calculated to obtain an average value. In this way, "the total area of the pores" is calculated. Moreover, as to "the total area of the macro pores", similarly to the above "total area of the pores", each taken image is binarized by the image analysis, and divided into the cavity portion and the partition wall portion other than the cavities. Then, all areas of portions corresponding to "the macro pores" in the respective images are calculated to obtain an average value. In this way, "the total area of the macro pores" is calculated.

When the honeycomb structure 100 satisfies the above conditions, the provision of the through channel making the exhaust gas diffuse effectively is ensured in the honeycomb catalyst. Therefore, the exhaust gas diffuses sufficiently in the honeycomb catalyst. As a result, it is possible to make the catalyst act effectively. That is, the catalyst which does not come in contact with the exhaust gas can reduce. Furthermore, in the honeycomb structure 100, the pores closed with the catalyst reduce when the honeycomb catalyst is prepared. Therefore, the thermal expansion ratio does not become excessively high as compared with a case where the number of the pores closed with the catalyst is large. As a result, the honeycomb catalyst using the honeycomb structure 100 as a support may show the excellent thermal shock resistance.

There is not any special restriction on an outer peripheral shape of the macro pores being contained in the partition walls, but the shape is preferably at least one of a circular shape and an elliptic shape. The outer peripheral shape of the macro pores is an outer peripheral shape of the pores in the cross section perpendicular to the cell extending direction. As just described, when the outer peripheral shape of the macro pores is at least one of the circular shape and the elliptic shape, the catalyst is uniformly loaded onto the surfaces of the macro pores. Therefore, the contact area between the catalyst and the exhaust gas increases. As a result, the honeycomb catalyst using the present honeycomb structure as a support has a further suitable purification efficiency of the exhaust gas.

There is not any special restriction on a thickness of the partition walls 5, but the thickness is preferably from 0.060 to 0.288 mm, further preferably from 0.108 to 0.240 mm, and especially preferably from 0.132 to 0.192 mm. When the thickness of the partition walls 5 is within the above range, it is possible to prepare the honeycomb structure having an enhanced strength and a reduced pressure loss. "The thickness of the partition walls 5" means the thickness of a wall (the partition wall) which separates two adjacent cells 4 in the cross section cut the honeycomb structure 100 off perpendicularly to the extending direction of the cells 4. "The thickness of the partition walls 5" can be measured by, for example, an image analysis device (trade name "NEXIV, VMR-1515" manufactured by Nikon Co., or the like).

There is not any special restriction on a cell density of the honeycomb structure 100, but the cell density is preferably from 15 to 140 cells/cm$^2$, further preferably from 31 to 116 cells/cm$^2$, and especially preferably from 46 to 93 cells/cm$^2$. When the cell density of the honeycomb structure 100 is within the above range, the increase of the pressure loss can be suppressed while maintaining the strength of the honeycomb structure. "The cell density" is the number of the cells per unit area in the cross section perpendicular to the cell extending direction.

It is preferable that the partition walls 5 contain a ceramic material as a main component. Specifically, the material of the partition walls 5 is preferably at least one species selected from the group consisting of silicon carbide, a silicon-silicon carbide composite material, cordierite, mullite, alumina, spinel, a silicon carbide-cordierite composite material, lithium aluminum silicate, and aluminum titanate. Among these materials, cordierite is preferable. When cordierite is used as the material of the partition walls 5, it is possible to obtain a honeycomb structure having a small coefficient of thermal expansion and showing an excellent thermal shock resistance. Incidentally, "the partition walls contain the ceramic material as the main component" means that the partition walls contain 50 mass % or more of the ceramic material in the whole material.

The cells 4 extend through the honeycomb structure 100 from one end face 2 to another end face 3 of the honeycomb structure 100, to become the through channels of the fluid. A shape of an outer peripheral edge of an open frontal area of the cells 4 at the one end face 2 is a quadrangular shape. Hereinafter, the one end face may be referred to as the inflow end face. There is not any special restriction on the shape of the outer peripheral edge of the open frontal area at the inflow end face, and it may be, for example, polygonal shapes such as a triangular shape and a hexagonal shape, a circular shape, and an elliptic shape with the exception of quadrangular shape. There is not any special restriction on a shape of an outer peripheral edge of an open frontal area of the cells 4 at another end face 3. The shape of the outer peripheral edge of the open frontal area of the cells 4 at another end face 3 may be the same as or different from the shape of the outer peripheral edge of the open frontal area of the cells 4 at the inflow end face. For example, it may be polygonal shapes such as a triangular shape, a quadrangular shape and an octagonal shape, a circular shape, and an elliptic shape.

The honeycomb structure 100 shown in FIG. 1 includes an outer peripheral wall 7 provided at an outer periphery. There is not any special restriction on a thickness of the outer peripheral wall 7, but the thickness is preferably from 0.2 to 4.0 mm. When the thickness of the outer peripheral wall 7 is within the above range, the increase of the pressure loss can be prevented while moderately maintaining the strength of the honeycomb structure.

A material of the outer peripheral wall 7 is preferably the same as that of the partition walls 5, but it may be different.

There is not any special restriction on a shape of the honeycomb structure 100, but the shape is preferably a cylindrical shape, a tubular shape in which a bottom surface is elliptic, or a tubular shape in which the bottom surface is a polygonal shape such as a quadrangular, pentangular, or hexagonal shape, or the like, and the cylindrical shape is further preferable. Moreover, there is not any special restriction on a size of the honeycomb structure 100, but a length of the honeycomb structure in the cell extending direction is preferably from 50 to 300 mm. Moreover, when an outer shape of the honeycomb structure 100 is, for example, a cylindrical shape, a diameter of the bottom surface thereof is preferably from 110 to 350 mm.

[2] Manufacturing Method for Honeycomb Structure:

For the honeycomb structure of the present invention, for example, the following manufacturing method can be employed. The manufacturing method for the honeycomb structure of the present invention includes a kneaded clay preparing step of kneading forming raw materials containing 1 to 15 mass % of a pore former having an average particle diameter of 50 to 200 μm to obtain a kneaded clay; a forming step of extruding the kneaded clay to obtain a honeycomb formed body; and a firing step of firing the honeycomb formed body. The kneaded clay preparing step is the step of mixing and kneading the forming raw materials containing a ceramic raw material and the pore former to obtain the kneaded clay. In this kneaded clay preparing step, as the pore former, there is used the pore former having an average particle diameter of 50 to 200 μm by 1 to 15 mass % with respect to the total amount of forming raw materials. The forming step is the step of extruding the obtained kneaded clay into a honeycomb shape to obtain the honeycomb formed body provided with a plurality of cells extending through the honeycomb formed body from one end face to another end face. The firing step is the step of firing the obtained honeycomb formed body to obtain the honeycomb structure including the porous partition walls defining the plurality of cells to form the through channels of the fluid and having the plurality of pores therein. According to the above manufacturing method for the honeycomb structure, the above-mentioned honeycomb structure of the present invention can suitably be prepared.

Hereinafter, the above manufacturing method for the honeycomb structure will specifically be described.

[2-1] Kneaded Clay Preparing Step:

In the present step, the forming raw materials containing the ceramic raw material and the pore former are mixed and kneaded to obtain the kneaded clay. Moreover, in the present step, it is preferable to use the pore former having an average particle diameter of 50 to 200 μm. Furthermore, a content ratio of this pore former is from 1 to 15 mass % in the forming raw materials. When such a pore former is used, it is possible to prepare the honeycomb structure including "the partition walls having "a porosity of 45 to 70%" and having "the total area of the macro pores being 50% or more with respect to the total area of the pores"". In particular, in addition to the pores formed by ceramic raw material, the macro pores formed by firing above pore former to disappear are existed in the partition walls of honeycomb structure by using the pore former having above average particle diameter at above content ratio.

Examples of the pore former include starch, resin balloons, a water-absorbing resin, and silica gel.

The average article diameter of the pore former is preferably from 50 to 200 μm as described above, further preferably from 80 to 170 μm, and especially preferably from 100 to 150 μm. When the average particle diameter of the pore former is excessively large, the pore diameters become excessively large, and the strength may be reduced. On the other hand, when the average particle diameter of the pore former is excessively small, it may be hard to fill the catalyst into the pores when the catalyst is loaded.

The content ratio of the pore former in the forming raw materials is preferably from 1 to 15 mass %, further preferably from 1 to 10 mass %, especially preferably from 1 to 8 mass %, and most preferably from 1 to 6 mass %. When the content ratio of the pore former is smaller than 1 mass %, a ratio of the macro pores being contained in the partition walls tends to decrease. Therefore, an amount of the catalyst which can be loaded onto the honeycomb structure might decrease. On the other hand, when the content ratio of the pore former is larger than 15 mass %, the ratio of the macro pores being contained in the partition walls tends to become excessively large. Therefore, the strength of the honeycomb structure might reduce.

The ceramic raw material is preferably at least one species selected from the group consisting of silicon carbide, a silicon-silicon carbide composite material, a cordierite forming raw material, mullite, alumina, spinel, a silicon carbide-cordierite composite material, lithium aluminum silicate, and aluminum titanate. Among these materials, the cordierite forming raw material is preferable. The reason is that it is possible to obtain the honeycomb structure having a small coefficient of thermal expansion and showing an excellent thermal shock resistance.

The forming raw materials may contain a dispersion medium, an additive and the like, with the exception of the ceramic raw material and the pore former.

An example of the dispersion medium is water. Examples of the additive include an organic binder and a surfactant. A content amount of the dispersion medium is preferably from 30 to 150 parts by mass with respect to 100 parts by mass of the ceramic raw material.

Examples of the organic binder include methylcellulose, hydroxypropoxyl cellulose, hydroxyethyl cellulose, carboxymethylcellulose, and polyvinyl alcohol. Among these binders, methylcellulose and hydroxypropoxyl cellulose are preferably used together. A content amount of the organic binder is preferably from 1 to 10 parts by mass with respect to 100 parts by mass of the ceramic raw material.

As the surfactant, ethylene glycol, dextrin, fatty acid soap, polyalcohol or the like can be used. One of these surfactants may be used alone, or a combination of two or more of the surfactants may be used. A content ratio of the surfactant is preferably from 0.1 to 5.0 parts by mass with respect to 100 parts by mass of the ceramic raw material.

There is not any special restriction on a method for kneading the forming raw materials to form the kneaded clay, but an example of the method is a method using a kneader, a vacuum kneader or the like.

[2-2] Forming Step:

In the present step, the kneaded clay obtained in the kneaded clay preparing step is extruded into the honeycomb shape to obtain the honeycomb formed body. This honeycomb formed body is provided with the plurality of cells extending through the honeycomb formed body from one end face to another end face. The extrusion forming can be performed by using a die having desirable cell shape, partition wall thickness and cell density. As a material of the die, a cemented carbide which does not easily wear down is preferable.

[2-3] Firing Step:

In the present step, the obtained honeycomb formed body is fired to obtain the honeycomb structure. This honeycomb structure includes porous partition walls defining the plurality of cells to form the through channels of the fluid and having the plurality of pores therein.

A firing temperature can suitably be determined in accordance with a material of the honeycomb formed body. When the material of the honeycomb formed body is, for example, cordierite, the firing temperature is preferably from 1380 to 1450° C., and further preferably from 1400 to 1440° C. Moreover, a firing time is preferably from about 3 to 10 hours.

The honeycomb formed body may be dried before firing. There is not any special restriction on a drying method, but examples of the drying method include hot air drying, microwave drying, dielectric drying, reduced-pressure drying, vacuum drying, and freeze-drying. Among these methods, the dielectric drying, the microwave drying or the hot air drying is preferably performed alone, or a combination of the methods is preferably performed. Moreover, as drying conditions, it is preferable that a drying temperature is from 30 to 150° C. and a drying time is 1 minute to 2 hours.

Figure 4:
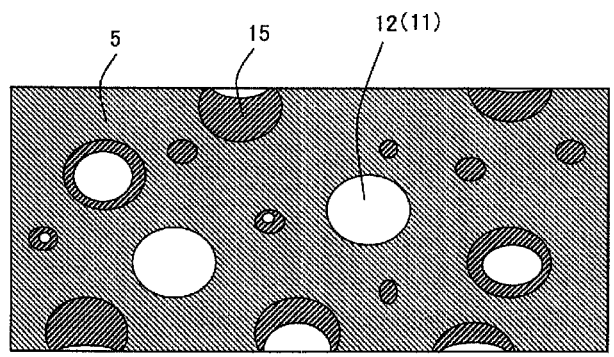
FIG. 4 is an enlarged cross sectional view schematically showing part of partition walls of an embodiment of a honeycomb catalyst according to the present invention.

[3] Honeycomb Catalyst:

The honeycomb catalyst of the present invention includes the above-mentioned honeycomb structure of the present invention, and a catalyst loaded onto the surfaces of the pores being contained in the partition walls of this honeycomb structure. Moreover, in this honeycomb catalyst, a total area of "high cavity ratio pores which are the macro pores having a catalyst occupying area of 50% or less among the macro pores" is from 15 to 40% with respect to a total area of the pores. Therefore, in the honeycomb catalyst of the present invention, one may produce a honeycomb structure having thorough channels capable of making the exhaust flow through efficiently. Therefore, the exhaust gas suitably diffuses in the honeycomb catalyst. Thus, a contact chance between the exhaust gas and the catalyst increases, and the catalyst is effectively used for purifying the exhaust gas. In consequence, the honeycomb catalyst of the present invention has a good purification efficiency. FIG. 4 is an enlarged cross sectional view schematically showing part of the partition walls of an embodiment of the honeycomb catalyst according to the present invention. As shown in FIG. 4, in the partition walls 5 of the honeycomb catalyst, a large number of pores 11 which are not closed with a catalyst 15 are present. That is, in the partition walls 5 of the honeycomb catalyst, a large number of pores through which the exhaust gas can suitably pass are present. Therefore, the exhaust gas having flowed into the honeycomb catalyst suitably diffuses in the honeycomb catalyst. As a result, the honeycomb catalyst of the present invention has a good purification efficiency of the exhaust gas.

As described above, the high cavity ratio pores are "the macro pores having the catalyst occupying area of 50% or less" among the macro pores. That is, the high cavity ratio pores are the pores (the macro pores) onto which the catalyst substantially is not loaded. In this way, since the honeycomb catalyst of the present invention includes the pores onto which the catalyst substantially is not loaded at a predetermined ratio, the provision of through channels making the exhaust gas flowing through the honeycomb catalyst diffuse is ensured and the exhaust gas suitably diffuses in the honeycomb catalyst. Incidentally, "the total area of the high cavity ratio pores" is the total area occupied by cavity portions of the high cavity ratio pores. "The cavity portions" are spaces through which the exhaust gas can pass. In other words, each of the cavity portions is a region which is excluded a region occupied by the catalyst from a region of pore that is surrounded with an outer peripheral edge of the pore.

Incidentally, in the present specification, "the total area of the high cavity ratio pores" is a value calculated as follows. First, by the scanning type electron microscope (SEM), a plurality of arbitrary view fields of cross sections, which are perpendicular to a cell extending direction, of the partition walls of the honeycomb catalyst are taken. Then, each taken image is binarized by the image analysis, and divided into the cavity portion and a portion other than cavities (the partition wall portion and the catalyst portion). Next, all areas of the cavity portions of portions corresponding to "the high cavity ratio pores (i.e., "the macro pores having the catalyst occupying area of 50% or less")" are calculated, to obtain an average value. In this way, "the total area of the high cavity ratio pores" is calculated.

In the honeycomb catalyst of the present invention, when the exhaust gas is allowed to flow into predetermined cells from an inflow-side end face (the one end face), the exhaust gas penetrates the partition walls, and the purified gas is discharged from an outflow-side end face (another end face). In the honeycomb catalyst of the present invention, when the exhaust gas penetrates the partition walls, harmful substances such as carbon monoxide (CO), hydrocarbon (HC) and nitrogen oxides (NOx) are purified by the catalyst loaded onto the partition walls. In the honeycomb catalyst of the present invention, since the catalyst which does not come in contact with the exhaust gas reduces, the catalyst can effectively act. Therefore, the purification efficiency of the exhaust gas becomes good. Incidentally, the exhaust gas is one which is discharged from a stationary engine for a car, a construction machine or an industrial purpose, a burning appliance, or the like.

In the honeycomb catalyst of the present invention, as described above, "the total area of the high cavity ratio pores" is preferably from 15 to 40% with respect to the total area of the pores, further preferably from 15 to 30%, and especially preferably from 15 to 20% with respect to the total area of the pores. When it is within the above range, the catalyst can further effectively be used for purifying the exhaust gas. Therefore, the honeycomb catalyst has better purification efficiency. When "the total area of the high cavity ratio pores" is smaller than 15% with respect to the total area of the pores, a large number of pores closed with the catalyst are present, and the exhaust gas does not sufficiently diffuse in the honeycomb catalyst. As a result, the purification efficiency of the exhaust gas of the honeycomb catalyst becomes worse. In addition, the pressure loss increases. When it is larger than 40%, since the exhaust gas passing through the high cavity ratio pores increases, the exhaust gas which does not come in contact with the catalyst increases. Therefore, the purification efficiency of the exhaust gas of the honeycomb catalyst becomes worse.

In the honeycomb catalyst of the present invention, a filling ratio of the catalyst is preferably from 50% to 85%, further preferably from 60 to 80%, and especially preferably from 65 to 75%. When the filling ratio of the catalyst is within the above range, the exhaust gas suitably diffuses in the honeycomb catalyst. Therefore, the purification efficiency of the exhaust gas is suitably maintained. In addition, the increase of the pressure loss of the honeycomb catalyst can be prevented. When the filling ratio of the catalyst is smaller than 50%, the pressure loss might increase. When it is larger than 85%, the purification efficiency of the exhaust gas might reduce. In addition, the pressure loss of the honeycomb catalyst might increase. "The filling ratio of the catalyst" is a value calculated by image analysis of an image taken by the scanning type electron microscope (SEM). Specifically, the value can be calculated as follows. First, the cross sections, which are perpendicular to the cell extending direction, of the partition walls of the honeycomb catalyst are taken by the scanning type electron microscope (SEM), and each taken image is binarized by the image analysis, and divided into a cavity portion and a portion other than cavities (the partition wall portion and the catalyst portion). Then, from the binarized image, "a total area of "the catalyst"" and "the total area of "the pores"" are obtained. Afterward, the filling ratio of the catalyst is calculated in accordance with the equation: $(A/(A+B))\times 100$. In the equation, A shows "the total area of the catalyst". And B shows "the total area of the pores".

[3-1] Catalyst:

The catalyst can suitably be determined in accordance with a purpose. Examples of the catalyst include a ternary catalyst, an oxidation catalyst, an NOx selective reduction catalyst, and an NOx adsorber reduction catalyst. A loaded amount of the catalyst per unit volume is preferably from 100 to 300 g/liter, and further preferably from 150 to 250 g/liter.

The ternary catalyst is the catalyst which mainly purifies hydrocarbon (HC), carbon monoxide (CO), and nitrogen oxides (NOx). An example of the ternary catalyst is a catalyst including platinum (Pt), palladium (Pd), or rhodium (Rh).

An example of the oxidation catalyst is a catalyst containing a noble metal. Specifically, the catalyst preferably contains at least one selected from the group consisting of platinum, palladium, and rhodium.

An example of the NOx selective reduction catalyst is a catalyst containing at least one selected from the group consisting of metal-substituted zeolite, vanadium, titania, tungsten oxide, silver, and alumina.

Examples of the NOx adsorber reduction catalyst include an alkali metal and/or an alkali earth metal. Examples of the alkali metal include potassium, sodium, and lithium. An example of the alkali earth metal is calcium.

[4] Manufacturing Method for Honeycomb Catalyst:

The honeycomb catalyst of the present invention can be manufactured, for example, as follows.

First, the honeycomb structure is prepared as a catalyst support. This honeycomb structure can be prepared by the above-mentioned manufacturing method for the honeycomb structure of the present invention.

Next, a catalyst slurry is prepared. An average particle diameter of the catalyst contained in the catalyst slurry is preferably from 0.5 to 5 μm. Furthermore, a viscosity of the catalyst slurry (25° C.) is preferably from 1 to 10 mPa·s. When both of the average particle diameter and the viscosity of the catalyst is smaller than a lower limit, the catalyst might excessively be filled into the pores. That is, a large number of pores might be closed with the catalyst. When the large number of pores are closed with the catalyst, the purification efficiency of the exhaust gas might become worse. In addition, the pressure loss of the honeycomb catalyst might increase. When both of the average particle diameter and the viscosity of the catalyst is larger than an upper limit, the catalyst might not sufficiently enter the pores of the honeycomb structure when the catalyst is loaded onto the honeycomb structure which is the support. Therefore, a catalyst loading layer might not sufficiently be formed on the surfaces of the pores of the honeycomb structure which is the support. As a result, the prepared honeycomb catalyst might not sufficiently purify the exhaust gas. As the above catalyst, the above-mentioned ones can suitably be selected for use.

Next, the catalyst slurry is loaded onto the honeycomb structure. As a method for loading the catalyst slurry onto the honeycomb structure, a well known method such as dipping or suction can be employed. Incidentally, an excessive catalyst slurry may be blown off with compressed air after performing the dipping, the suction or the like.

Next, the honeycomb structure onto which the catalyst slurry has been loaded is dried and fired. In this way, the honeycomb catalyst can be prepared. Drying can be performed at the conditions of from 120 to 180° C. and from 10 to 30 minutes. Firing can be performed at the conditions of from 550 to 650° C. and from 1 to 5 hours.

EXAMPLES

Hereinafter, the present invention will specifically be described based on the examples, but the present invention is not limited to these examples.

[Porosity (%)]

A porosity (%) was measured by a mercury porosimeter (mercury intrusion technique). As the mercury porosimeter, trade name: Auto Pore III type 9405 manufactured by Micromeritics Co. was used.

[Ratio of Total Area of Macro Pores]:

By a scanning type electron microscope (SEM), four arbitrary view fields of cross sections, which were perpendicular to a cell extending direction, of partition walls of a honeycomb structure were taken. A magnification was 100 times. Each view field included length 640 pixels×width 480 pixels. Each pixel was 1 µm. The taken image was binarized by using an image analysis system ("WINROOF" manufactured by MITANI Co.), and divided into a cavity portion and a portion other than cavities (the partition wall portion). A total area of pores and a total area of macro pores in each taken view field were obtained. Then, a ratio (%) of "the total area of the macro pores" with respect to "the total area of the pores" was calculated for each view field, to obtain an average value. In this way, the ratio (%) of "the total area of the macro pores" with respect to "the total area of the pores" was calculated.

[Ratio of Total Area of High Cavity Ratio Pores]:

By the scanning type electron microscope (SEM), four arbitrary view fields of cross sections, which were perpendicular to a cell extending direction, of partition walls of a honeycomb catalyst were taken. A magnification was 100 times. Each view field included length 640 pixels×width 480 pixels. Each pixel was 1 µm. The taken image was binarized by using the image analysis system ("WINROOF" manufactured by MITANI Co.), and divided into a cavity portion and a portion other than cavities (the partition wall portion and the catalyst portion). A total area of pores and a total area of high cavity ratio pores (i.e., the areas of the cavity portions in the high cavity ratio pores) in each taken view field were obtained. Then, a ratio (%) of "the total area of the high cavity ratio pores" with respect to "the total area of the pores" was calculated for each view field, to obtain an average value. In this way, the ratio (%) of "the total area of the high cavity ratio pores" with respect to "the total area of the pores" was calculated.

[Filling Ratio of Catalyst]:

After the binarization was performed in the same manner as in the evaluation of the above [Ratio of Total Area of High Cavity Ratio Pores], a filling ratio of the catalyst in the honeycomb catalyst was calculated in accordance with the equation: $(A/(A+B))\times100$. In the equation, A showed "a total area of the catalyst". B showed "the total area of the pores".

Example 1

[Preparation of Honeycomb Structure]

As a cordierite forming raw material, alumina, aluminum hydroxide, kaolin, talc and silica were used. To 100 parts by mass of the cordierite forming raw material, 17 parts by mass of a pore former, 85 parts by mass of a dispersion medium, 8 parts by mass of an organic binder and 3 parts by mass of a surfactant were added, respectively. Afterward, the materials were mixed and kneaded to prepare a kneaded clay. As the dispersion medium, water was used, and as the pore former, resin balloon having an average particle diameter of 102 µm was used. As the organic binder, hydroxypropyl methylcellulose was used. As a dispersant, ethylene glycol was used.

Next, the kneaded clay was extruded by using a predetermined die to obtain a honeycomb formed body. In cross sections of the honeycomb formed body which were perpendicular to a cell extending direction, quadrangular cells were formed, and the whole shape was a columnar shape. Then, the obtained honeycomb formed body was dried by a microwave dryer. Afterward, the honeycomb formed body was completely dried by a hot air dryer. Then, both end faces of the dried honeycomb formed body were cut off to adjust the one at a predetermined dimension.

The honeycomb formed body obtained in this way was further fired at 1410 to 1440° C. for 5 hours to obtain a honeycomb structure.

The obtained honeycomb structure had a diameter of 266.7 mm and a length of 152.4 mm in a central axis direction (described as the "length" in Table 1). A thickness of each of partition walls (described as the "partition wall thickness" in Table 1) was 165.1 µm, and a porosity of the partition walls was 45%. A cell density was 62.0 cells/cm². An average pore diameter of the partition walls was 23 µm. Moreover, a total area of macro pores was 50% with respect to a total area of all pores (described as a "ratio of the "total area of the macro pores"" in Table 1). The average pore diameter of the partition walls was measured by a mercury porosimeter (the mercury intrusion technique). Incidentally, the pores having small diameter (around 5 µm) which are formed due to talc and the like in the cordierite raw material and the pores having large diameter which are formed by pore former were existed. Therefore, the average pore diameters of the partition walls were 23 µm as described above.

Next, 1 kg of water was added to 200 g of β-zeolite having an average particle diameter of 5 µm, followed by performing a wet grinding with a ball mill. 20 g of alumina sol was added as a binder to obtained crushed particles to obtain a catalyst slurry. A viscosity of this catalyst slurry was 5 mPa·s. Then, the honeycomb structure was immersed into this catalyst slurry to form layers of the above catalyst slurry on the partition wall surfaces and pore surfaces of the honeycomb structure. Afterward, this honeycomb structure was dried at 120°

C. for 20 minutes, and then fired at 600° C. for 1 hour. A honeycomb catalyst was prepared in this way.

In the obtained honeycomb catalyst, a loaded amount of a catalyst was 250 g/L. In the honeycomb catalyst, a ratio of "total area of high cavity ratio pores" was 20%. A filling ratio of the catalyst was 70%. The results were shown in Table 1. Moreover, an average pore diameter of the catalyst layer was 2.0 μm, which was the same as an average particle diameter of the crushed particles.

tures of the honeycomb catalyst and the gas for test could be regulated by a heater. As the heater, an infrared image furnace was used. As the gas for test, there was used a gas obtained by mixing nitrogen with 5 vol % of carbon dioxide, 14 vol % of oxygen, 350 ppm of nitrogen monoxide (in terms of the volume), 350 ppm of ammonia (in terms of the volume) and 10 vol % of water. As this gas for test, the water and a gas mixture obtained by mixing the other gases were separately prepared. Then, when the test was carried out, these gases

TABLE 1

| | Diameter (mm) | Length (mm) | Partition wall thickness (μm) | Porosity (%) | Cell density (cells/cm$^2$) | Average pore Diameter (μm) | Average particle diameter of pore former (μm) | Content ratio of pore former (%) |
|---|---|---|---|---|---|---|---|---|
| Example 1 | 266.7 | 152.4 | 165.1 | 45 | 62.0 | 23 | 102 | 8 |
| Example 2 | 266.7 | 152.4 | 165.1 | 55 | 62.0 | 22 | 98 | 10 |
| Example 3 | 266.7 | 152.4 | 165.1 | 70 | 62.0 | 20 | 89 | 12 |
| Example 4 | 266.7 | 152.4 | 165.1 | 49 | 62.0 | 24 | 106 | 9 |
| Example 5 | 266.7 | 152.4 | 165.1 | 50 | 62.0 | 23 | 102 | 9 |
| Example 6 | 266.7 | 152.4 | 165.1 | 49 | 62.0 | 22 | 98 | 9 |
| Example 7 | 266.7 | 152.4 | 165.1 | 50 | 62.0 | 20 | 89 | 9 |
| Example 8 | 266.7 | 152.4 | 165.1 | 52 | 62.0 | 24 | 106 | 9 |
| Example 9 | 266.7 | 152.4 | 165.1 | 51 | 62.0 | 21 | 93 | 9 |
| Example 10 | 266.7 | 152.4 | 165.1 | 50 | 62.0 | 22 | 98 | 9 |
| Example 11 | 266.7 | 152.4 | 165.1 | 45 | 62.0 | 23 | 102 | 8 |
| Example 12 | 266.7 | 152.4 | 165.1 | 45 | 62.0 | 23 | 102 | 8 |
| Example 13 | 266.7 | 152.4 | 165.1 | 45 | 62.0 | 23 | 102 | 8 |
| Example 14 | 266.7 | 152.4 | 165.1 | 45 | 62.0 | 23 | 102 | 8 |
| Example 15 | 266.7 | 152.4 | 165.1 | 45 | 62.0 | 23 | 102 | 8 |
| Comp. Ex. 1 | 266.7 | 152.4 | 165.1 | 43 | 62.0 | 23 | 102 | 8 |
| Comp. Ex. 2 | 266.7 | 152.4 | 165.1 | 72 | 62.0 | 30 | 133 | 13 |
| Comp. Ex. 3 | 266.7 | 152.4 | 165.1 | 45 | 62.0 | 23 | 102 | 8 |
| Comp. Ex. 4 | 266.7 | 152.4 | 165.1 | 45 | 62.0 | 21 | 93 | 8 |
| Comp. Ex. 5 | 266.7 | 152.4 | 165.1 | 35 | 62.0 | 4 | 18 | 6 |
| Comp. Ex. 6 | 266.7 | 152.4 | 165.1 | 50 | 62.0 | 13 | 58 | 9 |

| | Ratio of "total area of macro pores" (%) | Loaded Amount of catalyst (g/L) | Filling ratio of catalyst (%) | Ratio of "total area of high cavity ratio pores" (%) |
|---|---|---|---|---|
| Example 1 | 50 | 250 | 70 | 20 |
| Example 2 | 50 | 250 | 72 | 21 |
| Example 3 | 50 | 250 | 75 | 18 |
| Example 4 | 50 | 250 | 68 | 17 |
| Example 5 | 60 | 250 | 84 | 18 |
| Example 6 | 50 | 250 | 69 | 22 |
| Example 7 | 50 | 250 | 71 | 18 |
| Example 8 | 50 | 250 | 73 | 19 |
| Example 9 | 50 | 250 | 74 | 20 |
| Example 10 | 50 | 250 | 71 | 18 |
| Example 11 | 50 | 250 | 70 | 16 |
| Example 12 | 50 | 250 | 70 | 15 |
| Example 13 | 50 | 250 | 70 | 35 |
| Example 14 | 50 | 250 | 70 | 40 |
| Example 15 | 50 | 250 | 70 | 45 |
| Comp. Ex. 1 | 50 | 250 | 52 | 45 |
| Comp. Ex. 2 | 50 | 250 | 91 | 8 |
| Comp. Ex. 3 | 45 | 250 | 55 | 44 |
| Comp. Ex. 4 | 40 | 250 | 54 | 41 |
| Comp. Ex. 5 | 5 | 250 | 40 | 42 |
| Comp. Ex. 6 | 35 | 250 | 40 | 44 |

The prepared honeycomb catalyst was subjected to evaluations of [Purification Efficiency], [Pressure Loss] and [Thermal Shock Resistance]. Evaluation methods of the respective evaluations were as follows.

[Purification Efficiency (NOx Purification Ratio)]

First, a gas for test including NOx was allowed to flow into the honeycomb catalyst of the present examples. Afterward, an amount of the NOx in the exhaust gas discharged from this honeycomb catalyst was analyzed by a gas analysis measurement.

Here, a temperature of the gas for test allowed to flow into the honeycomb catalyst was 200° C. Incidentally, temperawere mixed in a pipe lines to obtain the gas for test. As the gas analysis measurement, "MEXA9100EGR manufactured by HORIBA Co." was used. Moreover, a space speed at the flowing of the gas for test into the honeycomb catalyst was 50000 (time$^{-1}$).

An "NOx purification ratio" in Table 2 was a value obtained by dividing, by an amount of the NOx in the gas for test, a value obtained by subtracting the amount of the NOx in the gas discharged from the honeycomb catalyst from the amount of the NOx in the gas for test, and multiplying the obtained value by 100. Here, when the NOx purification ratio was 70% or more, the evaluation of the purification efficiency was "good". And, when the NOx purification ratio was smaller than 70%, the evaluation of the purification efficiency was "inferior".

[Pressure Loss]

Under room temperature conditions, air was allowed to flow through the honeycomb catalyst at a flow speed of 0.5 m³/minute. In this state, a difference between a pressure on an air inflow side and a pressure on an air outflow side was measured. This pressure difference was calculated as a pressure loss. A pressure loss ratio was calculated based on the calculated pressure loss, and this pressure loss ratio was evaluated. As an evaluation reference of the pressure loss, when the pressure loss ratio was 1.15 or more, the evaluation was "inferior". When the pressure loss ratio was smaller than 1.15, the result of the evaluation was "good". Incidentally, "the pressure loss ratio" was a value of the ratio of the pressure loss of the honeycomb catalyst, when the pressure loss of the honeycomb catalyst of Example 1 was "1.00".

[Thermal Shock Resistance]

First, the honeycomb catalyst was disposed in a furnace at 500° C., and held for 60 minutes. Immediately after the holding, the honeycomb catalyst was exposed to ordinary temperature. In this case, when cracks were generated in an end surface of the honeycomb catalyst, the evaluation of the thermal shock resistance was "inferior" (described as "NG" in Table 2). When the cracks were not generated in the end surface, the evaluation of the thermal shock resistance was "good" (described as "OK" in Table 2).

The honeycomb catalyst of the present example had an NOx purification ratio of 75%. That is, the evaluation of the purification efficiency was "good". Moreover, a pressure loss ratio was 1.00. That is, the evaluation of the pressure loss was "good". Furthermore, the evaluation of the thermal shock resistance was "good". The results were shown in Table 2.

TABLE 2

|  | NOx purification ratio (%) | Pressure loss ratio | Thermal Shock Resistance |
| --- | --- | --- | --- |
| Example 1 | 75 | 1.00 | OK |
| Example 2 | 74 | 1.01 | OK |
| Example 3 | 73 | 1.03 | OK |
| Example 4 | 75 | 1.02 | OK |
| Example 5 | 76 | 1.02 | OK |
| Example 6 | 71 | 1.04 | OK |
| Example 7 | 73 | 1.03 | OK |
| Example 8 | 76 | 1.00 | OK |
| Example 9 | 74 | 1.02 | OK |
| Example 10 | 75 | 1.06 | OK |
| Example 11 | 81 | 1.02 | OK |
| Example 12 | 81 | 1.01 | OK |
| Example 13 | 80 | 1.06 | OK |
| Example 14 | 82 | 1.02 | OK |
| Example 15 | 75 | 1.02 | OK |
| Comparative Example 1 | 76 | 1.20 | OK |
| Comparative Example 2 | 61 | 0.91 | NG |
| Comparative Example 3 | 74 | 1.18 | OK |
| Comparative Example 4 | 74 | 1.16 | OK |
| Comparative Example 5 | 73 | 1.21 | OK |
| Comparative Example 6 | 75 | 1.17 | OK |

Examples 2 to 15 and Comparative Examples 1 to 6

Honeycomb structure were prepared to satisfy the diameter, the length in a central axis direction, the partition wall thickness, the porosity of partition wall, the cell density, the average pore diameter and the ratio of "total area of macro pores" shown in Table 1. Afterward, honeycomb catalysts were prepared by using the prepared honeycomb structures to satisfy the loaded amount of catalyst, the filling ratio of the catalyst, and the ratio of "total area of high cavity ratio pores" shown in Table 1, similarly to Example 1. The prepared honeycomb catalysts were subjected to evaluations of [Purification Efficiency], [Pressure Loss] and [Thermal Shock Resistance] similarly to Example 1. The results were shown in Table 2.

As seen in Table 2, it was possible to confirm that a more amount of catalysts were loaded onto the honeycomb catalysts of Examples 1 to 15 as compared with the honeycomb catalysts of Comparative Examples 1 to 6. Moreover, it was possible to confirm that the purification efficiencies of the examples were good.

In Comparative Examples 3 to 6, the NOx purification ratio was 70% or more, and the evaluation of the purification efficiency was "good". However, the pressure loss ratio was large, and the evaluation of the pressure loss was "inferior". Here, in Comparative Examples 3 to 6, for decreasing the pressure loss ratio, it is necessary to decrease the loaded amount of the catalyst. However, when the loaded amount of the catalyst is decreased, the NOx purification ratio decreases, and the evaluation of the purification efficiency becomes "inferior". That is, it is understood that when the total area of the macro pores is smaller than 50% with respect to the total area of all the pores, it is difficult to obtain the honeycomb catalyst having a sufficient purification efficiency.

A honeycomb structure and a honeycomb catalyst of the present invention can suitably be used for purifying an exhaust gas discharged from an engine.

Description of Reference Numerals

2: one end face, 3: another end face, 4: cell, 5: partition wall, 7: outer peripheral wall, 10 and 11: pores not closed with catalyst, 12: macro pore, 15: catalyst, and 100: honeycomb structure.

What is claimed is:

1. A honeycomb catalyst comprising a honeycomb structure comprising porous partition walls defining a plurality of cells to form through channels for a fluid and having a plurality of pores therein and a catalyst loaded onto the surfaces of the pores being contained in the partition walls, wherein a porosity of the partition walls is from 45 to 70%, in a cross section perpendicular to an extending direction of the cells, a total area of macro pores having the largest pore diameter of larger than 10 μm is 50% or more with respect to a total area of the pores, in the cross section perpendicular to an extending direction of the cells, a total area of high cavity ratio pores which are the macro pores having a catalyst occupying area of 50% or less among the macro pores is from 15 to 40% with respect to a total area of the pores, and wherein the honeycomb catalyst is manufactured by loading a catalyst slurry, wherein the average particle diameter of the catalyst contained in the catalyst slurry is from 0.5 to 5 μm and the viscosity of the catalyst slurry is from 1 to 10 mPa·s.

2. The honeycomb catalyst according to claim 1, wherein in the cross section perpendicular to the extending direction of the cells, an outer peripheral shape of the macro pores being contained in the partition walls is at least one of a circular shape and an elliptic shape.

3. The honeycomb catalyst according to claim 1, wherein the thickness of the partition walls is from 0.060 to 0.288 mm.

4. The honeycomb catalyst according to claim 1, wherein the cell density of the honeycomb structure is from 15 to 140 cells/cm².

5. The honeycomb catalyst according to claim 1, wherein a filling ratio of the catalyst is 50 to 85%.

\* \* \* \* \*